Figure 1:
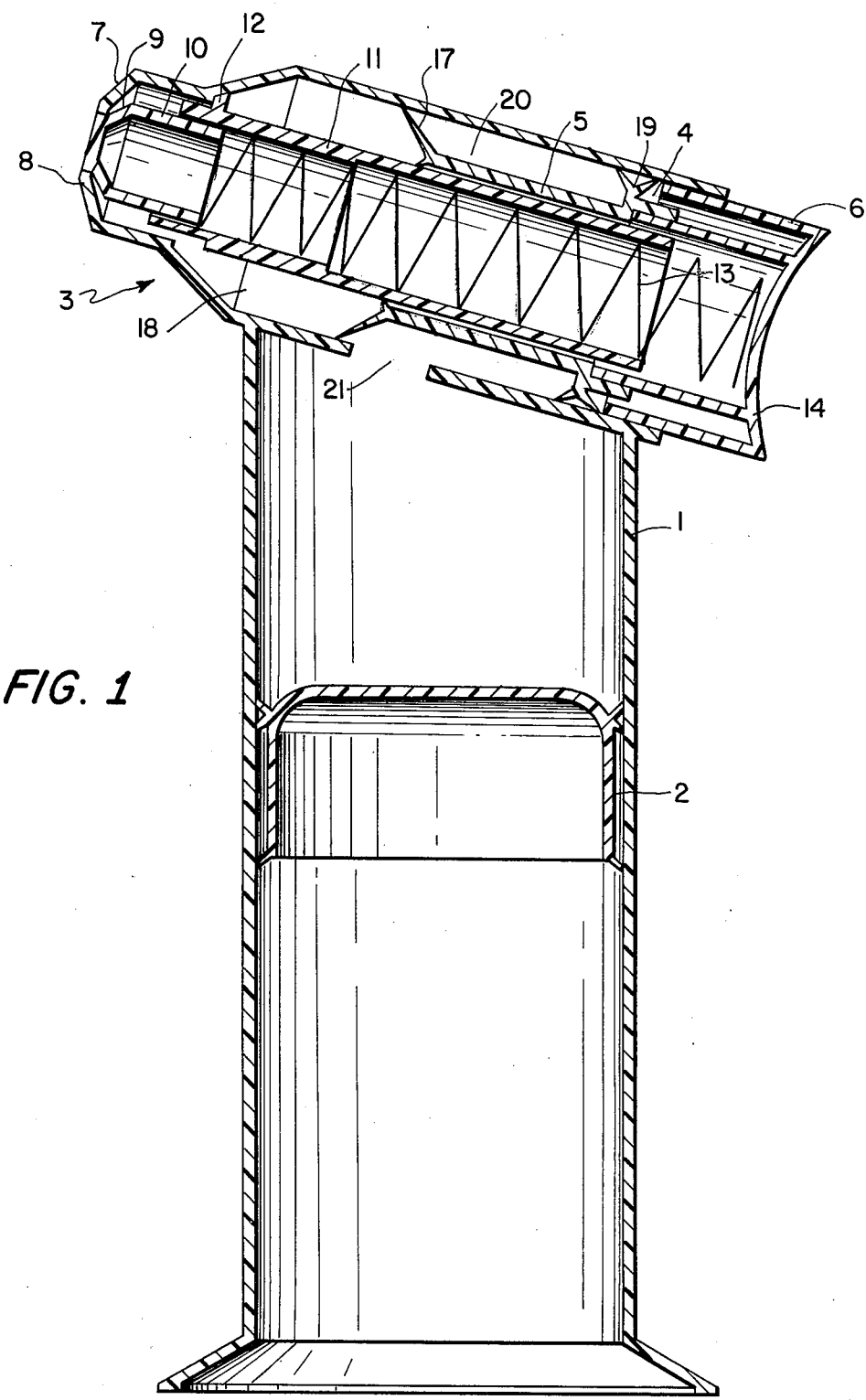

United States Patent [19]

Eckert

[11] 4,323,175

[45] Apr. 6, 1982

[54] DISPENSER UTILIZING A FOLLOWER AND DELIVERY DEVICE FOR DISPENSING PASTES, CREAMS, ETC.

[76] Inventor: Josef Eckert, Suhlestrasse 69, D-8744 Mellrichstadt, Fed. Rep. of Germany

[21] Appl. No.: 142,052

[22] Filed: Apr. 21, 1980

[30] Foreign Application Priority Data

Apr. 19, 1979 [DE] Fed. Rep. of Germany ....... 2916206

[51] Int. Cl.³ .............................................. G01F 11/00
[52] U.S. Cl. .................................. 222/256; 222/387; 222/380
[58] Field of Search ............... 222/256, 257, 387, 386, 222/380, 383

[56] References Cited

U.S. PATENT DOCUMENTS

| | | | |
|---|---|---|---|
| 2,060,297 | 11/1936 | Fox | 222/256 |
| 2,112,450 | 3/1938 | Tear | 222/256 |
| 2,172,521 | 9/1939 | Shoner | 222/380 X |
| 2,198,383 | 4/1940 | Graham | 222/256 |
| 2,886,215 | 5/1959 | Klein et al. | 222/256 |
| 3,209,957 | 10/1965 | Sundholm | 222/380 X |

Primary Examiner—Allen N. Knowles
Attorney, Agent, or Firm—Cantor and Singer

[57] ABSTRACT

A dispenser for cream, sauces, jelly, pastes, syrups or the like which has a main cylinder and a guide cylinder coaxially arranged within it. The annular space between the cylinders is divided into an intake space and a feed space by a displacement piston which allows for drawing the material to be dispensed from a container through an intake passage in the main cylinder and discharging the material through an outlet opening in the forward end of the main cylinder. A closure element is normally biased against the outlet opening and a plunger is provided at the rear end of the main cylinder, bearing against the piston and normally biased in the outward position.

9 Claims, 2 Drawing Figures

DISPENSER UTILIZING A FOLLOWER AND DELIVERY DEVICE FOR DISPENSING PASTES, CREAMS, ETC.

The invention relates to a dispenser for cream, pastes, sauces, jelly, syrups or the like, with a supply container in which a piston is fitted for axial displacement, and with a delivery device which has an actuating part and an outlet opening. Such dispensers have already been obtainable commercially for some time as toothpaste dispensers.

In the known dispensers, the supply container is closed on its upper side with an elastic, bell-like cap on which is seated a handle-shaped, hollow actuating part, a connecting opening between the supply container and the handle part being closable by a flap valve which opens in the direction of the handle part. A piston is fitted sealingly, but displaceable axially only in the direction of the bell-like cap, in the supply container, on the side of the latter opposite to the cap.

In using the already-known dispenser, axial pressure is applied to the actuating part, so that the cap is dented and the actuating part is thus moved in the direction of the supply container. Since the piston is provided in the supply container with a spreader ring, which permits only a displacement in the direction of the cap, but not in the reverse direction, the whole of the contents in the dispenser are placed under pressure in this manner. Because of the reduction of volume arising from the denting of the cap, toothpaste escapes from the outlet opening. If the actuating part is released again, it moves upwards again because of the elastic cap and draws some of the contents from the supply container with it in the direction of the cap, the piston in the supply container traveling correspondingly, by a smaller amount, towards the cap.

It has been found in practice that the previously known dispenser has several basic disadvantages. From the nature of its function, it is particularly and awkwardly noticeable that a considerable force is required at first for operation, before any denting of the elastic cap occurs at all. If the force opposing denting is overcome, the cap then dents in suddenly like a table-tennis ball. As a consequence, a given amount of toothpaste squirts suddenly from the outlet opening of the dispenser, and exact metering of the toothpaste according to the individual desire of the user is not possible. Furthermore it is difficult to apply toothpaste accurately to a toothbrush, since the outlet opening of the dispenser moves suddenly, on operation, in the direction of the supply container.

A further functional disadvantage of the prior art dispenser is that for actuation the pressure required to deliver the toothpaste has to be built up in the whole supply container. If now small air bubbles are to be included in the toothpaste, the total volume of the air bubbles can be so large that it is elastically compressed on actuation of the dispenser and hence no toothpaste can be delivered. It has furthermore been found with toothpaste that owing to the fluctuating pressure buildup in the whole supply container the viscosity of the toothpaste decreases such that after the dispenser has been actuated three times it is frequently no longer able to function for a time, until the original high viscosity of the toothpaste is regained.

The object of the invention is to develop a dispenser of the type mentioned above but which enables the contents to be dispensed to be delivered with good metering and which works simply and conveniently.

This object is achieved by the invention in that the actuating part has a displacement piston which is displaceable in a cylinder space and which has an end packing seal and a rear sealing ring, the packing seal separating a delivery space in front of the outlet opening from a feed space between the packing seal and the sealing ring; and in that the feed space is connected to the supply container via a constantly open passage; and in that a spring-loaded closure piece is fitted in the delivery space and is movable in one direction towards the outlet opening and in the other direction sealingly against the force of a pressure spring in a guide cylinder which is closed with respect to the delivery space.

By means of this design according to the invention, the amount of contents delivered is always exactly proportional to the displacement path of the actuating part. Hence it is easy for the user to dispense exactly the desired amount of contents. During delivery, only the small amount of the contents present in the delivery space is pressurized, while the contents in the supply container are uninfluenced. Hence the viscosity of the contents in the dispenser does not vary owing to the action of pressure. Furthermore, air inclusions in the supply container do not influence the delivery of the contents.

The dispenser according to the invention is relatively cheap to manufacture and works efficiently, which is partly to be attributed to the fact that no flap valve has to be fitted in the region of the contents and having to open and close in the contained material.

It is a great advantage for the manipulation of the container that the length of the outlet opening does not alter on operation of the dispenser, so that, e.g., toothpaste can be very easily and accurately applied to the toothbrush.

Since no pressure builds up in the supply container on actuation of the dispenser according to the invention, the piston in the supply container can be designed such that it is axially displaceable in both directions, while the piston in the prior art dispenser has to be displaceable only in the direction of the delivery device. Hence it is possible each time with the dispenser according to the invention to top it up, in that the piston is pulled out downwards by hand.

The closure piece ensures that after use of the dispenser no air is sucked through the outlet opening into the delivery space when the displacement piston moves back, but that contents arrive in the feed space from the supply container.

Moreover, because of the closure piece, the outlet opening of the dispenser does not need to be manually closed after use with a cap or other means, which from experience is easily forgotten. With the dispenser according to the invention, the outlet opening is positively blocked after each use by the spring-loaded closure piece. Thus the risk of drying of the contents, particularly in the region of the outlet opening, is eliminated.

It is structurally particularly simple if the guide cylinder sealingly passes through the displacement piston.

A further favorable embodiment of the invention consists in that the actuating part engages like a pot over the guide cylinder as far as the displacement piston, and the compression spring is supported between the closure piece and the actuating part. By this design, the spring can fulfill a double function. On the one hand it urges the closure piece into the closed position, and on the other hand it prestresses the displacement piston, with its actuating part, into the inactive position and moves it back, after actuation of these parts, into its basic position. The compression spring is protected by the guide cylinder from contact with the contents. The space in the guide cylinder is easy to dimension large enough for a relatively strong compression spring to be accommodated, and it is thus ensured, even with viscous contents, that the displacement piston is automatically pushed back into its inactive position and hence is able to suck contents from the supply container into the feed space. The strong compression spring likewise causes the closure piece to close the outlet opening each time.

A particularly good sealing action of the closure piece is obtained according to an advantageous embodiment of the invention in which the closure piece has a conical face which can move into the outlet opening. This embodiment is particularly advantageous when it is necessary to keep the contents sealed against loss of aroma. The conical face also causes the closure piece to center itself automatically in the outlet opening.

For good tactile properties it is favorable for the cylinder space to be arranged transverse to the main extent of the supply container and to run at an inclination with respect to the normal to the supply container in the direction of the actuating part.

From the point of view of manufacture, a further embodiment of the invention is appropriate, according to which the displacement piston is made integral with the packing seal and the sealing ring, and the actuating part is firmly connected to the displacement piston.

A further embodiment of the invention is also favorable according to which the supply container has an oval cross section. Thus the supply container then fits well into the hand during actuation, similar to a pistol grip.

Thus, according to the broadest aspect of this invention, there is provided a dispenser for cream, sauces, jelly, pastes, syrups or the like comprising a main cylinder having an intake passage through the wall thereof and continuously communicating with a container, and an outlet opening in the forward end thereof, the rearward end being open; a guide cylinder disposed within said main cylinder and being coaxial therewith; a cylinder space defined by the inner wall of said main cylinder and the outer wall of said guide cylinder; a displacement piston slidingly supported by said guide cylinder and having a packing seal at the forward end and a sealing ring at the rearward end, said packing seal and sealing ring contacting said inner wall of said main cylinder, said packing seal thereby dividing said cylinder space into a rear feed space communicating with said intake passage, and a forward delivery space communicating with said outlet opening; actuating means slidingly disposed in said open end of said main cylinder and in operating engagement with said piston; closure means juxtaposed with said outlet opening and arranged for sliding movement in said guide cylinder; and means normally biasing said closure means against said outlet opening and said actuating means in its rearmost position.

Figure 2:
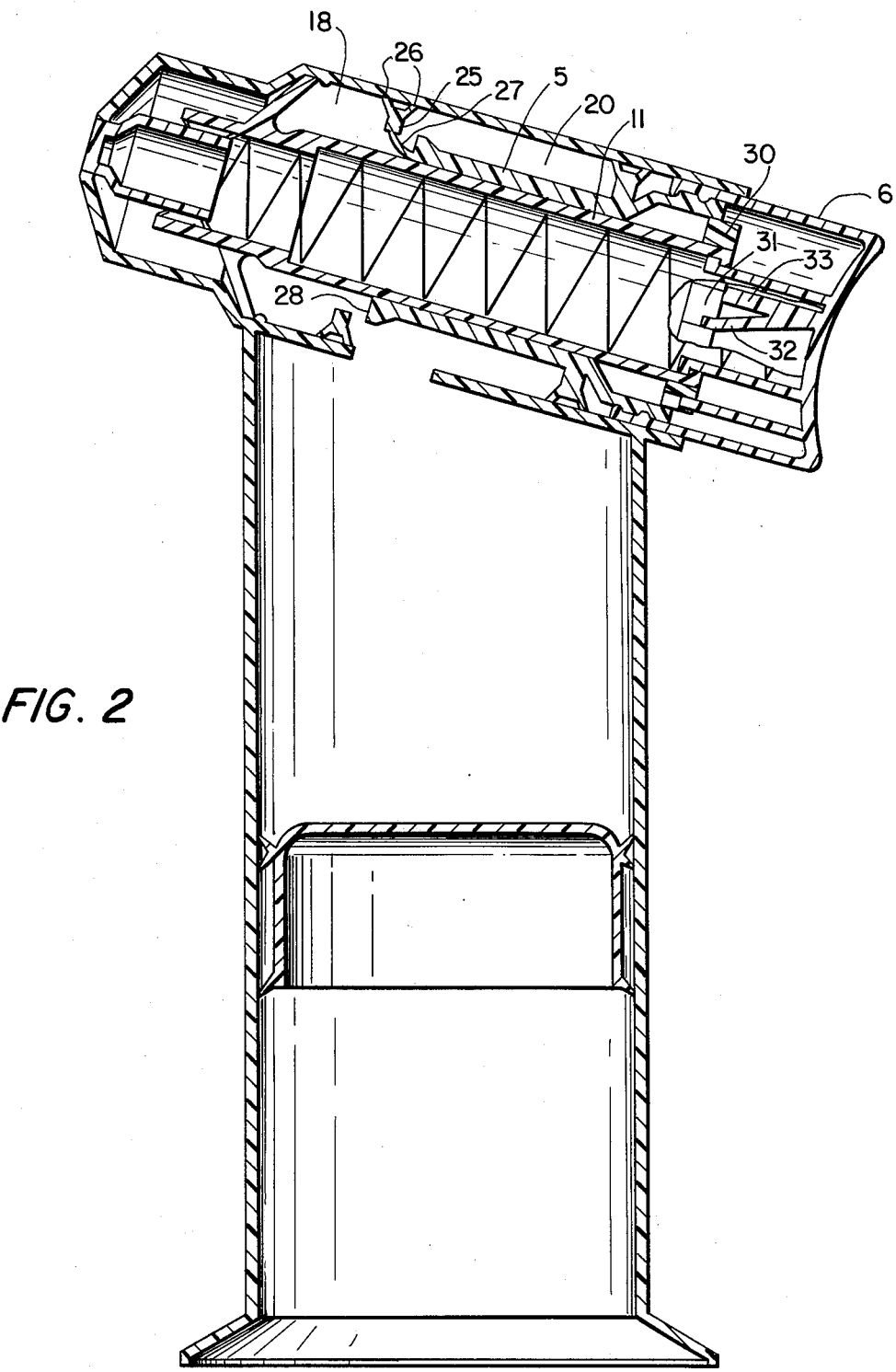

Many embodiments of the invention are possible. Two of them are shown in the drawings and are described below. There are shown in:

FIG. 1, a first embodiment of the dispenser according to the invention, in longitudinal section;

FIG. 2, a second embodiment of the dispenser according to the invention, in longitudinal section.

The dispenser as shown has a supply container 1, in which the contents to be dispensed are stored. The cross section of the supply container can be round, or also oval or angular. A piston 2 is axially displaceable in this supply container 1 and arranged sealingly at the walls of the supply container 1. A delivery device 3 is provided on the upper side of the supply container 1, transverse to the main direction in which the supply container 1 extends. This delivery device 3 has a cylinder space 4, in which is arranged a displacement piston, to be displaced axially. This displacement piston 5 is connected to a pot-like actuating part 6. Of course, the displacement piston 5 and the actuating part 6 can also be integral. The reason for the two-part design is of a manufacturing nature.

The cylinder space 4 tapers at one side and has an outlet opening 8 at its end face 7. A closure piece 10 has a conical face 9 which is seated sealingly in this outlet opening 8, and is sealingly guided in a guide cylinder 11. This guide cylinder 11 is held centrally in the cylinder space 4 by ribs 12, and passes through the displacement piston 5. A compression spring 13 is located within the guide cylinder 11 and is supported on one side against the closure piece 10 and on the other side against a terminal surface 14 of the actuating part 6. Hence, in the inactive position, the closure piece 10 is held in the outlet opening 8 and the displacement piston 5 is held, with the actuating part 6, in an end position against a stop.

It is functionally important that the displacement piston 5 has a packing seal 17 on its end face on the outlet opening side, with a sealing lip that permits passage of the contents in the direction of the outlet opening 8 but blocks it in the reverse direction. A delivery space 18 is formed by this packing seal 17 in the cylinder space 4, in front of the packing seal 17. The other side of the packing seal 17 is limited towards the actuating part 6 by a sealing ring 19, so that a feed space 20 exists between the packing seal 17 and the sealing ring 19, and is constantly connected to the supply container 1 via a passage 21.

The dispenser as described operates as follows. If pressure is applied to the terminal surface 14 of the actuating part 6, the displacement piston 5 is displaced, to the left as seen in the drawing, in the direction of the outlet opening 8. As a result, a pressure is built up in the delivery space, acts on the closure piece 10 and displaces it, against the force of the compression spring 13, to the right as seen in the drawing, since the interior of the guide cylinder 11 is unpressurized. This displacement of the closure part 10 frees the outlet opening 8, so that the contents can be delivered from the delivery space 18 through the outlet opening 8.

If a sufficient amount of contents has been taken from the dispenser, the actuating part 6 is released. The compression spring 13 presses the actuating part 6, together with the displacement piston 5 back into its original position. This pressure first builds up in the delivery space 18, so that the closure piece 10 can again reach the closed position. The sealing lip of the packing seal 17 moves radially inwards and allows contents to reach the delivery space 18 from the feed space 20. Since the sealing ring 19 moves to the right, as seen in the drawing, and thus away from the outlet opening 8, contents are sucked out of the supply container 1, so that the feed space 20 and the delivery space 18 constantly remain full of the material. The piston 2 rises in the supply container 1 in proportion as contents are drawn out via the passage 21.

The embodiment according to FIG. 2 differs from that previously described by a different form of the end seal of the displacement piston 5 and by a favorable actuating device, so that the dispenser becomes childproof.

The seal will first be described. This has a sealing body 25 which sealingly abuts the inner wall of the delivery space 18 with sealing lips 26. The sealing body 25 is connected by, for example, four elastic webs 27 to the displacement piston 5, such that it can sealingly seat on the end face 28 of the displacement piston 5. This is constructionally a particularly simple seal. Hence contents can enter the delivery space 18 from the feed space 20, between the webs 27, on the return stroke of the displacement piston 5. On a forward stroke of the displacement piston, the end face 28 seats against the sealing body 25, so that the feed space 20 is separated from the delivery space 18.

The sealing body 25 thus fulfills the same function exactly as the packing seal 17 of the embodiment according to FIG. 1. It produces a stronger suction force, however, and is therefore particularly suitable for highly viscous media.

The childproof embodiment of the dispenser as shown in FIG. 2 will now be explained. The guide cylinder 11 is closed on the actuating part side by a locking ring 30 which has an opening 31. An elastic spring tongue 32 of the actuating part 6 projects into this opening 31 such that the actuating part 6 is prestressed in the clockwise direction. A stationary rib 33 is seated on the locking ring 30 near the opening 31. By rotation of the actuating part 6 counterclockwise, against the force of the spring tongue 32, the rib 33 can be brought into a position flush with the opening 31, so that the actuating part can then be depressed.

What is claimed is:

1. Dispenser for cream, sauces, jelly, pastes, syrups or the like comprising a main cylinder having an intake passage through the wall thereof and continuously communicating with a container, and an outlet opening in the forward end thereof, the rearward end being open; a guide cylinder disposed within said main cylinder and being coaxial therewith; an annular cylinder space defined by the inner wall of said main cylinder and the outer wall of said guide cylinder; a displacement piston slidingly supported by said guide cylinder and having a packing seal at the forward end and a sealing ring at the rearward end, said packing seal and sealing ring contacting said inner wall of said main cylinder, said packing seal thereby dividing said cylinder space into a rear feed space communicating with said intake passage, and a forward delivery space communicating with said outlet opening; actuating means slidingly disposed in said open end of said main cylinder and in operating engagement with said piston; closure means juxtaposed with said outlet opening and arranged for sliding movement in said guide cylinder; and means normally biasing said closure means against said outlet opening and said actuating means in its rearmost position.

2. Dispenser according to claim 1, wherein the actuating part engages pot-like over the guide cylinder to engage the displacement piston, and the biasing means is a compression spring which is supported between the closure piece and the actuating part.

3. Dispenser according to claim 1, wherein the closure piece has a conical face which is movable into the outlet opening.

4. Dispenser according to claim 1, wherein the cylinder space is arranged transverse to the direction in which the container mainly extends.

5. Dispenser according to claim 1, wherein the cylinder space runs, relative to the normal to the direction in which the container mainly extends, inclined in the direction of the actuating part.

6. Dispenser according to claim 1, wherein the displacement piston is made integral with the packing seal and the sealing ring, and the actuating part is connected firmly to the displacement piston.

7. Dispenser according to claim 1, wherein the container has an oval cross section.

8. Dispenser according to claim 1, wherein the end seal of the displacement piston consists of a seal-lip body which can be sealingly applied against the end face of the displacement piston during the latter's forward stroke, but can be lifted from the end face during the backward stroke of the displacement piston.

9. Dispenser according to claim 8, wherein the seal-lip body is attached by elastic webs to the end face of the displacement piston.

* * * * *

UNITED STATES PATENT AND TRADEMARK OFFICE
CERTIFICATE OF CORRECTION

PATENT NO. : 4,323,175
DATED : April 6, 1982
INVENTOR(S) : JOSEF ECKERT

It is certified that error appears in the above-identified patent and that said Letters Patent are hereby corrected as shown below:

On the cover page, Item [30] "Apr. 19, 1979" is changed to read --Apr. 21, 1979--

Signed and Sealed this

Thirtieth Day of November 1982

[SEAL]

Attest:

GERALD J. MOSSINGHOFF

Attesting Officer    Commissioner of Patents and Trademarks